US012116819B2

(12) United States Patent
Baldreich

(10) Patent No.: US 12,116,819 B2
(45) Date of Patent: Oct. 15, 2024

(54) FURNITURE DRIVE

(71) Applicant: Julius Blum GmbH, Hoechst (AT)

(72) Inventor: Armin Baldreich, Lauterach (AT)

(73) Assignee: JULIUS BLUM GMBH, Hoechst (AT)

( * ) Notice: Subject to any disclaimer, the term of this patent is extended or adjusted under 35 U.S.C. 154(b) by 149 days.

(21) Appl. No.: 17/964,559

(22) Filed: Oct. 12, 2022

(65) Prior Publication Data

US 2023/0031674 A1 Feb. 2, 2023

Related U.S. Application Data

(63) Continuation of application No. PCT/AT2021/060135, filed on Apr. 22, 2021.

(30) Foreign Application Priority Data

May 7, 2020 (AT) ................................ 50389/2020

(51) Int. Cl.
*E05F 1/10* (2006.01)
*E05D 3/14* (2006.01)
*E05F 1/12* (2006.01)

(52) U.S. Cl.
CPC .............. *E05F 1/1261* (2013.01); *E05D 3/14* (2013.01); *E05Y 2900/20* (2013.01)

(58) Field of Classification Search
CPC ....... E05F 1/1261; E05D 3/14; E05Y 2900/20
See application file for complete search history.

(56) References Cited

U.S. PATENT DOCUMENTS

| | | | | |
|---|---|---|---|---|
| 9,498,062 | B2 * | 11/2016 | Baldreich | A47B 96/00 |
| 9,719,283 | B2 * | 8/2017 | Holzapfel | A47B 96/00 |
| 9,909,346 | B2 * | 3/2018 | Holzapfel | E05F 1/1058 |
| 10,294,705 | B2 * | 5/2019 | Hirtsiefer | E05F 1/12 |
| 10,407,962 | B2 * | 9/2019 | Schluge | F16H 21/44 |

(Continued)

FOREIGN PATENT DOCUMENTS

| | | |
|---|---|---|
| DE | 102017126367 | 5/2019 |
| DE | 20 2018 102 084 | 9/2019 |

(Continued)

OTHER PUBLICATIONS

International Search Report issued Aug. 27, 2021 in International (PCT) Application No. PCT/AT2021/060135.

*Primary Examiner* — Jason W San
(74) *Attorney, Agent, or Firm* — Wenderoth, Lind & Ponack, L.L.P.

(57) ABSTRACT

A furniture drive for moving a furniture part movably-supported relative to a furniture carcass includes a housing to be arranged on or within a furniture panel of the furniture carcass, and an actuating arm assembly for moving the movable furniture part. The actuating arm assembly includes an actuating arm movably-supported relative to the housing, and the actuating arm is to be fixed to the movable furniture part. The actuating arm assembly is movable at least between a first relative position, in which the actuating arm is arranged within the housing, and a second relative position, in which the actuating arm is arranged outside the housing. An actuating device is releasably connected or to be connected to the actuating arm, and is configured to move the actuating arm assembly from the first relative position into the second relative position.

24 Claims, 7 Drawing Sheets

(56) References Cited

U.S. PATENT DOCUMENTS

| | | | | |
|---|---|---|---|---|
| 10,494,846 | B2 * | 12/2019 | Schmid | E05D 3/16 |
| 10,590,688 | B2 | 3/2020 | Salice | |
| 10,662,690 | B2 * | 5/2020 | Schluge | E05F 1/1253 |
| 10,876,336 | B2 | 12/2020 | Kruedener et al. | |
| 11,060,337 | B2 | 7/2021 | Sobolewski et al. | |
| 11,111,708 | B2 | 9/2021 | Kruedener et al. | |
| 11,248,406 | B2 * | 2/2022 | Nordieker | E05F 5/02 |
| 11,319,737 | B2 | 5/2022 | Nordieker et al. | |
| 2014/0317883 | A1 * | 10/2014 | Baldreich | E05F 1/1261 16/280 |
| 2014/0366322 | A1 * | 12/2014 | Salice | E05F 5/02 16/277 |
| 2015/0096147 | A1 * | 4/2015 | Rohner | E05F 5/006 16/233 |
| 2015/0351539 | A1 * | 12/2015 | Baldreich | E05F 1/1058 312/319.2 |
| 2016/0160551 | A1 * | 6/2016 | Lutz | E05D 11/1064 185/37 |
| 2017/0049232 | A1 * | 2/2017 | Rihtarec | A47B 88/463 |
| 2017/0051813 | A1 * | 2/2017 | Karu | E05F 1/16 |
| 2017/0247923 | A1 * | 8/2017 | Hirtsiefer | E05D 3/16 |
| 2017/0292307 | A1 * | 10/2017 | Hirtsiefer | E05F 3/20 |
| 2018/0058123 | A1 | 3/2018 | Salice | |
| 2019/0316394 | A1 | 10/2019 | Kruedener et al. | |
| 2019/0316398 | A1 | 10/2019 | Kruedener et al. | |
| 2020/0123827 | A1 | 4/2020 | Sobolewski et al. | |
| 2020/0131830 | A1 * | 4/2020 | Byun | E05D 11/0054 |
| 2021/0010311 | A1 | 1/2021 | Nordieker et al. | |
| 2021/0189780 | A1 | 6/2021 | Nordieker et al. | |
| 2022/0098910 | A1 | 3/2022 | Nordieker et al. | |
| 2022/0251890 | A1 * | 8/2022 | Hirtsiefer | E05C 19/022 |
| 2022/0259905 | A1 * | 8/2022 | Hirtsiefer | E05F 1/1058 |
| 2022/0259909 | A1 * | 8/2022 | Hirtsiefer | E05C 19/022 |
| 2022/0307309 | A1 * | 9/2022 | Hirtsiefer | E05F 5/10 |
| 2024/0052686 | A1 * | 2/2024 | Korda | A47B 46/00 |

FOREIGN PATENT DOCUMENTS

| | | |
|---|---|---|
| EP | 3 556 976 | 10/2019 |
| JP | 2018-508677 | 3/2018 |
| WO | 2018/192819 | 10/2018 |
| WO | 2019/091967 | 5/2019 |
| WO | 2020/157180 | 8/2020 |

* cited by examiner

FURNITURE DRIVE

BACKGROUND OF THE INVENTION

The present invention relates to a furniture drive for moving a furniture part movably-supported relative to a furniture carcass, in particular for moving a furniture flap configured to pivot relative to the furniture carcass about a horizontally extending axis. The furniture drive comprises: a housing configured to be arranged on or within a furniture panel of the furniture carcass, and an actuating arm assembly for moving the movable furniture part. The actuating arm assembly includes at least one actuating arm movably-supported relative to the housing, and the at least one actuating arm is configured to be fixed to the movable furniture part. The actuating arm assembly is movable at least between a first relative position, in which the at least one actuating arm is arranged within the housing, and a second relative position, in which the at least one actuating arm is arranged outside the housing.

Moreover, the invention concerns an item of furniture comprising a furniture carcass, a furniture part movably-supported relative to the furniture carcass, and a furniture drive of the type to be described for moving the movably-supported furniture part.

Moreover, the invention further relates to a method for mounting a furniture part to at least one furniture drive to the type to be described.

DE 20 2018 102 084 U1 discloses a furniture drive having a housing which, in a mounted condition, is substantially entirely received within a vertically extending furniture panel of the furniture carcass. In this way, the furniture drive can be integrated into the furniture panel of the furniture carcass in a compact and visually unobtrusive manner. In a delivery condition, the actuating arm assembly of the furniture drive is located in a fully open condition, and several actuating arms of the actuating arm assembly protrude through a front-sided opening of the housing. This has the drawback that the furniture drive, despite its compact construction, requires a relatively large space. Therefore, relatively large packaging sizes are necessary and there is also the danger that the frontward-protruding actuating arms can be damaged.

SUMMARY OF THE INVENTION

It is an object of the present invention to propose a furniture drive of the type mentioned in the introductory part, thereby avoiding the above-discussed drawbacks.

According to the invention, at least one actuating device is provided, the actuating device being configured to be releasably connected or being connected to the at least one actuating arm and being configured to move the actuating arm assembly from the first relative position into the second relative position.

In other words, an actuating device in the form of an opening aid is provided, the actuating device being connected or being configured to be releasably connected to the at least one actuating arm. With the aid of the actuating device, the at least one actuating arm—in a connected condition with the actuating device—can be moved from a closed position, in which the at least one actuating arm is arranged within the housing, into an open position, in which the at least one actuating arm is located outside the housing.

Accordingly, the entire actuating arm assembly of the furniture drive, in a delivery condition, can be located in the compact first relative position, in which the actuating arm assembly is located within the housing. After the furniture drive has been mounted to the furniture carcass in its compact delivery condition, an operator can bring out the at least one actuating arm from the housing with the aid of the actuating device, namely such that the operator applies a manual force (preferably a manual pulling force) to the actuating device connected to the actuating arm.

The actuating device is, in particular, of advantage when the housing of the furniture drive is entirely received within a furniture panel of the furniture carcass in a mounted condition. Without the presence of the actuating device, an operator would have to try to pry out the at least one actuating arm from the housing, for example with the aid of a screwdriver. This procedure might be very dangerous, in particular when a spring device is provided for applying a force to the actuating arm assembly. The actuating arm could then kick out by a force of the spring device in a direction of the open position in an uncontrolled manner, and there is a considerable risk of injuries to persons and damages to objects. Moreover, prying out the actuating arm from the housing brings the danger that the actuating arm assembly can be damaged, in particular scratched, by improperly positioning the tool.

According to an embodiment, the at least one actuating device includes at least one recess for receiving a tool, preferably a screwdriver. Accordingly, a tool, preferably a screwdriver, can be introduced into the provided recess of the actuating device. The actuating arm connected to the actuating device can then be moved from its closed position into its open position outside the housing in a controlled manner with the aid of the extended lever arm formed by the screwdriver. This is, in particular, of an advantage when the actuating arm assembly of the furniture drive is pressurized by a force of a spring device, as already mentioned before. In this way, a controlled opening movement of the actuating arm assembly can be afforded by applying a counterforce with the aid of the screwdriver.

According to an embodiment:

- the actuating arm assembly is pressurized by the spring device within a first pivotal angle range in a direction of the first relative position, and is pressurized by the spring device within a second pivotal angle range in a direction of the second relative position, and/or
- the spring device includes at least one helical spring, preferably at least one compression spring.

The item of furniture according to the invention comprises a furniture carcass, a furniture part movably-supported relative to the furniture carcass, in particular a furniture flap configured to pivot relative to the furniture carcass about a horizontally extending axis, and a furniture drive of the type in question for moving the movably-supported furniture part. According to an embodiment, the housing of the furniture drive is substantially entirely received within the furniture panel of the furniture carcass.

In the method according to the invention for mounting a furniture part to at least one furniture drive of the type in question:

- the housing of the at least one furniture drive is arranged on or within a furniture panel of the furniture carcass,
- the actuating arm assembly is moved from the first relative position into the second relative position with the aid of the at least one actuating device,
- the at least one actuating device is released from the at least one actuating arm, and the furniture part is mounted to the at least one actuating arm.

BRIEF DESCRIPTION OF THE DRAWINGS

Further details and advantages of the present invention will be described with the aid of the following description of figures.

DETAILED DESCRIPTION OF THE INVENTION

Figure 1A:
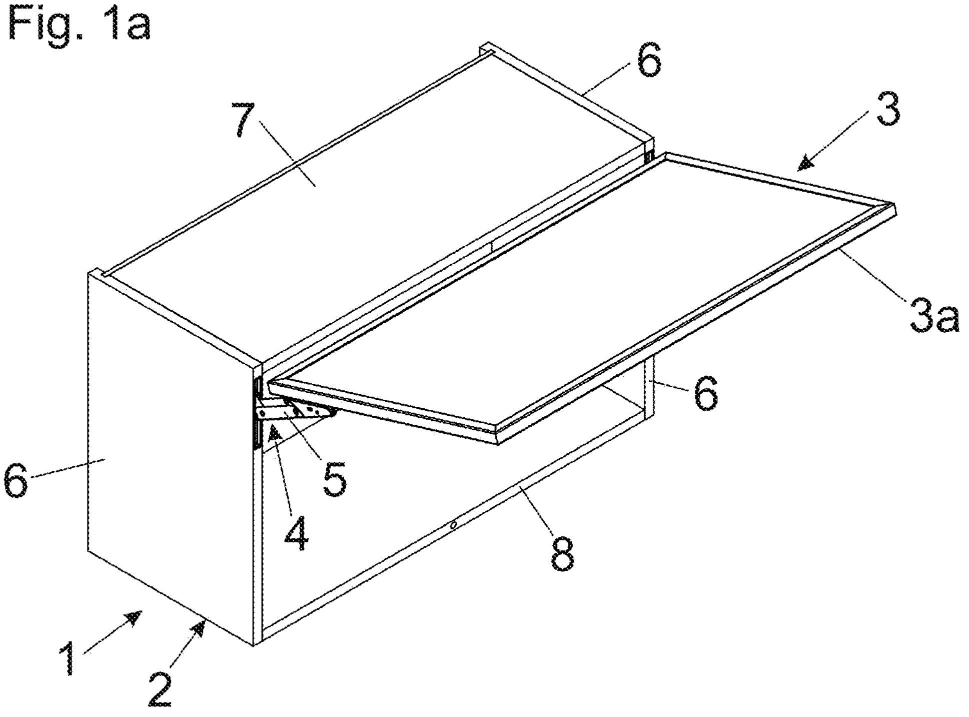
FIG. 1*a*, 1*b* show the item of furniture with the movable furniture part in a perspective view and in an exploded view.

FIG. 1*a* shows a perspective view of an item of furniture 1 comprising a furniture carcass 2, a furniture part 3 movably-supported relative to the furniture carcass 2, and at least one furniture drive 4 for moving the movable furniture part 3. The item of furniture 1 includes furniture panels 6 in the form of sidewalls, a top panel 7 and a bottom panel 8. For example, the movable furniture part 3 can be in the form of a furniture flap 3*a* configured to pivot relative to the furniture carcass 2 about a horizontally extending axis.

In the shown embodiment, the housing 9 of the furniture drive 4 is at least partially, preferably substantially entirely, integrated into the furniture panel 6 configured as a sidewall. The movable furniture part 3 is movably supported between a closed position in which the furniture carcass 2 is covered, and an elevated position relative to the furniture carcass 2.

Of course, it is also possible to integrate the furniture drive 4 within a horizontally extending furniture panel, thus within the top panel 7, within the bottom panel 8 and/or within a shelf 13 (FIG. 2*a*-2*d*) arranged between the top panel 7 and the bottom panel 8 for example. In such a case, the movable furniture part 3 is pivotally supported relative to the furniture carcass 2 about a vertically extending axis in the mounted position.

The actuating drive 4 includes an actuating arm assembly 5 for moving the movable furniture part 3, and at least one spring device 10 (FIG. 1*b*) for applying a force to the actuating arm assembly 5.

Figure 1B:
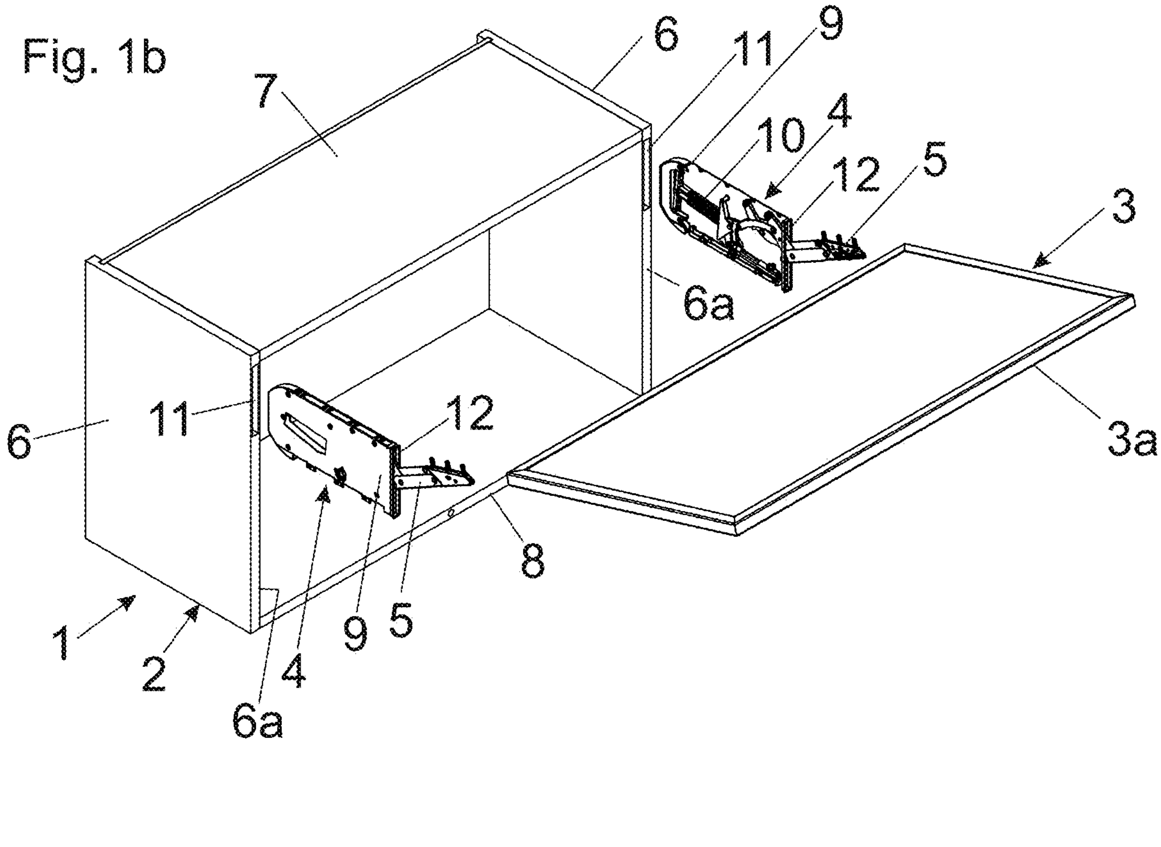

FIG. 1*b* shows the item of furniture 1 in an exploded view, in which two furniture drives 4, preferably configured to be identical in construction, are provided for moving the movable furniture part 3. Each of the furniture drives 4 includes a housing 9 configured to be fixed to the furniture carcass 2. According to an embodiment, it can be provided that the housing 9 of the furniture drive 4 is at least partially, preferably substantially entirely, received within a recess 11 of the furniture panels 6 configured as sidewalls. In a mounted condition, the housing 9 can be arranged substantially flush with a front face 6*a* of the furniture panel 6.

The recess 11 is configured as a blind hole for example. Upon mounting, the housing 9 can be inserted from the front (that is to say from the narrow front face 6*a* of the furniture panel 6) into the pocket-shaped recess 11 of the furniture panel 6. In a mounted condition, the furniture drive 4 is received within a predetermined wall thickness of the furniture panel 6.

At least one spring device 10 for applying a force to the actuating arm assembly 5 is arranged on or within the housing 9. A cover 12 is provided on a frontal-end region of the housing 9, and at least one movably-supported actuating arm 5*a*, 5*b*, 5*c*, 5*d* (FIG. 2*d*) of the actuating arm assembly 5 can be guided through the cover 12 in a relative position.

FIG. 2*a*-2*d* show the item of furniture 1 with the furniture carcass 2, and the housing 9 of the furniture drive 4 is substantially entirely received within the furniture panel 6. The item of furniture 1, besides the top panel 7 and the bottom panel 8, can have an additional shelf 13. The actuating arm assembly 5 for moving the movable furniture part 3 is thereby entirely received within the housing 9 of the furniture drive 4. Therefore, the furniture drive 4, in its delivery condition, adopts a very compact construction. In this way, the packaging sizes for the furniture drive 4 can be reduced, and the actuating arm assembly 5 can be protected from damages.

In order for the actuating arm assembly 5 to be moved out from the housing 9 of the furniture drive 4, an actuating device 14 is provided. The actuating device 14 can be configured as a component separate from the actuating arm assembly 5, and the actuating device 14 is configured to be connected to the at least one actuating arm 5*a* (FIG. 2*c*, FIG. 2*d*) of the actuating arm assembly 5.

The housing 9 of the furniture drive 4 includes a front-sided opening 17, and the at least one actuating arm 5*a* can be guided through the opening 17. According to an embodiment, it can be provided that the front-sided opening 17 of the housing 9 can be substantially entirely covered by the actuating device 14. In this way, the ingress of dirt or dust into the interior of the housing 9 can be reduced.

Figure 2A:
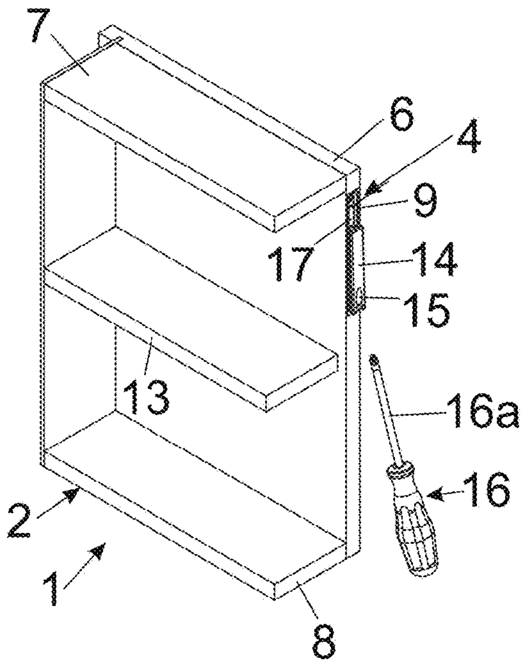
FIG. 2*a*-2*d* show a temporal sequence of the opening movement of the actuating arm assembly of the furniture drive with the aid of the actuating device.
Figure 2B:
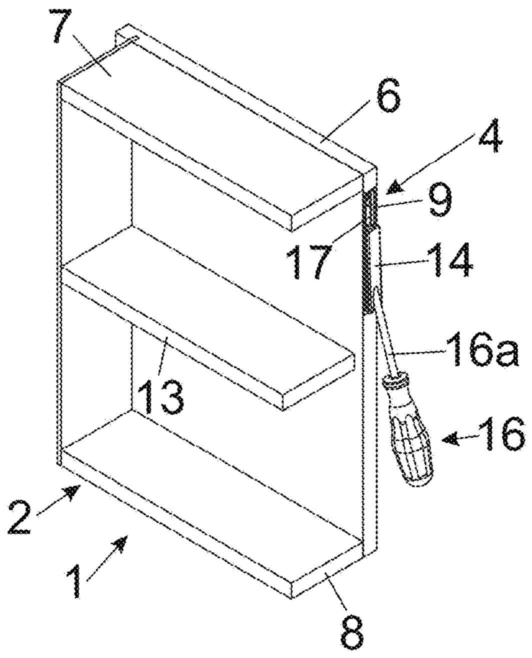

The actuating device 14 includes a recess 15 for receiving a tool 16, preferably a screwdriver 16*a*. By introducing the screwdriver 16*a* into the recess 15 and by subsequently lifting the screwdriver 16*a*, the actuating device 14 (jointly with the at least one actuating arm 5*a*) can be moved out from the housing 9 of the furniture drive 4 (FIG. 2*b*, FIG. 2*c*).

The actuating arm assembly 5 is movably supported between a first relative position, in which the at least one actuating arm 5*a* is arranged within the housing 9, and a second relative position, in which the at least one actuating arm 5*a* is arranged outside the housing 9.

Usually, the actuating arm assembly 5 is pressurized by the spring device 10 within a first pivotal angle range in a direction of the first relative position, and is pressurized by the spring device 10 within a second pivotal angle range in a direction of the second relative position. This means that the spring device 10, in a closing range of the actuating arm 5*a* immediately preceding the fully closed position, applies a closing force to the at least one actuating arm 5*a*. Accordingly, a manual force against a force of the spring device 10 muss be firstly exerted so as to move the actuating arm assembly 5 from the first relative position (closed position) in a direction of the second relative position (open position).

Figure 2C:
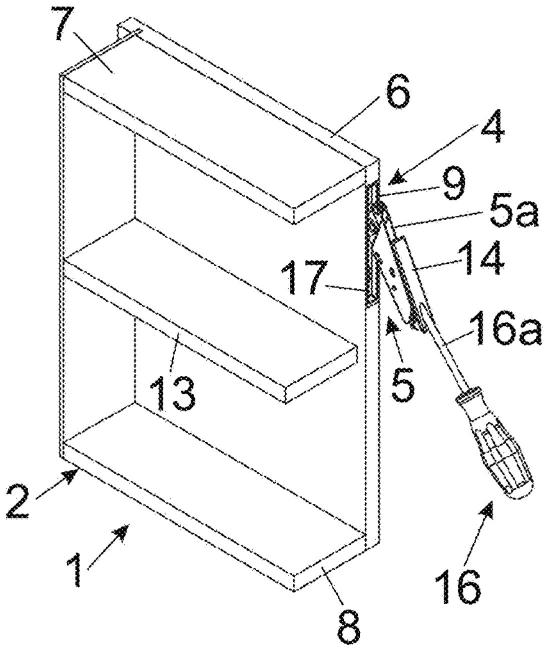

FIG. 2*c* shows the item of furniture 1 in a further open position of the actuating arm assembly 5. From this relative position, the spring device 10 applies an opening force to the actuating arm assembly 5. An operator can thus prevent an uncontrolled kicking-out movement of the at least one actuating arm 5*a*, namely by applying a manual force against the force of the spring device 10 with the aid of the screwdriver 16*a* introduced into the recess 15.

According to a preferred embodiment, it can be provided that the at least one actuating device 14, at least in the first relative position in which the at least one actuating arm 5*a* is arranged within the housing 9, is non-pivotally connected to the actuating arm 5*a*. Therefore, no relative movement between the actuating device 14 and the actuating arm 5*a* takes place. As a result, a controlled opening movement of the actuating arm assembly 5 can be provided.

Figure 2D:
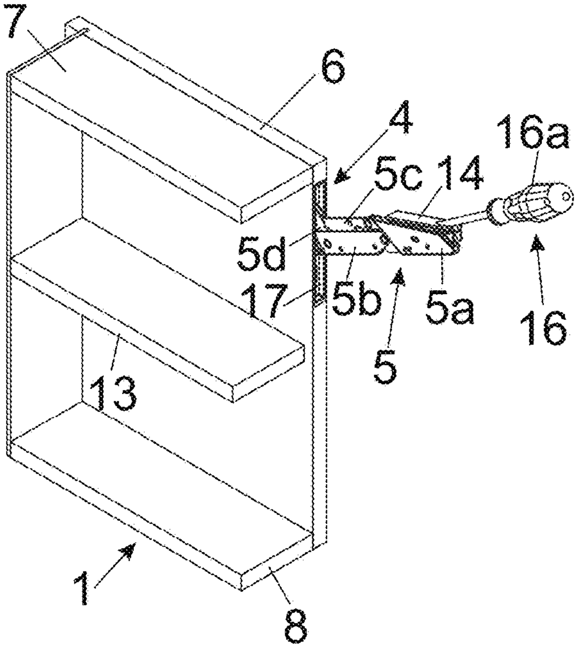

In FIG. 2*d*, the actuating arm assembly 5 of the furniture drive 4 is in a fully opened condition. The actuating device 14 can now be separated from the actuating arm 5*a* and can be recycled for example.

Figure 3A:
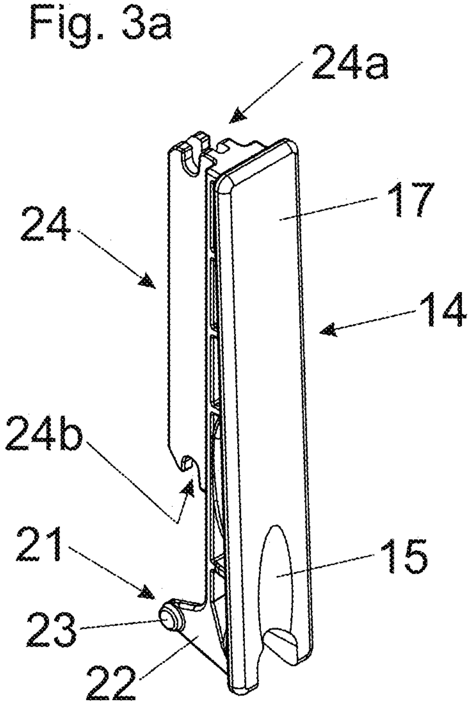
FIG. 3*a*-3*d* show the actuating device in different views.
Figure 3B:
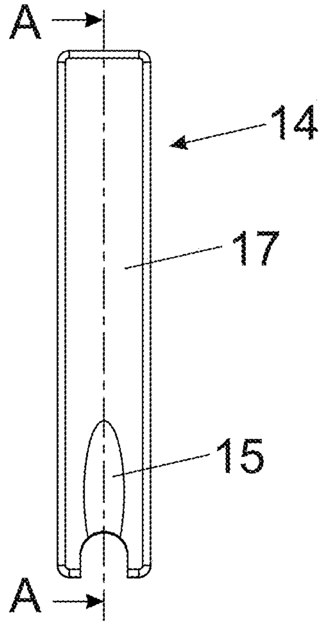
Figure 3C:
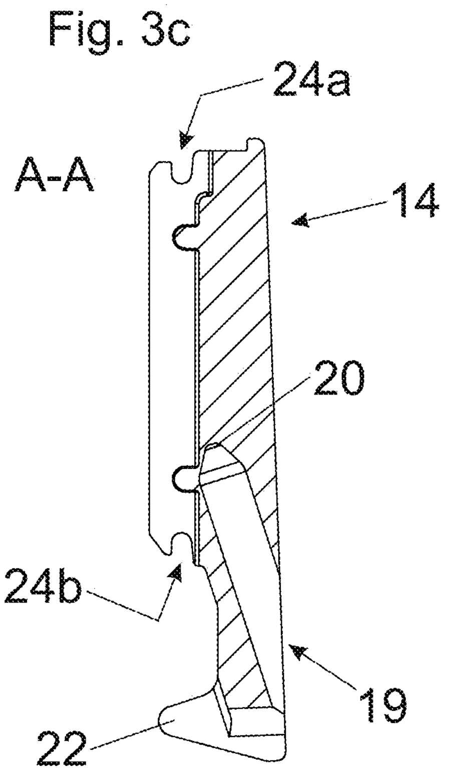
Figure 3D:
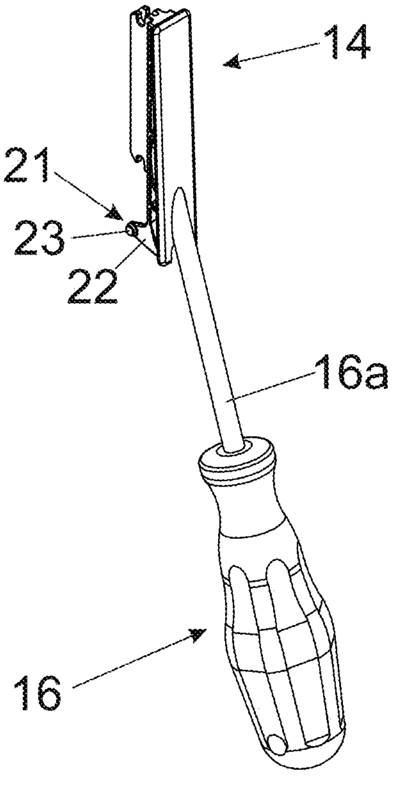

FIG. 3*a*-3*d* show the actuating device 14 in different views. FIG. 3*a* shows a perspective view of the actuating device 14. FIG. 3*b* shows the actuating device 14 in a view from the front. FIG. 3*c* shows a cross-sectional view of the actuating device 14 along the plane A-A depicted in FIG. 3*b*. FIG. 3*d* shows a perspective view of the screwdriver 16*a* introduced into the recess 15.

PREFERRED EMBODIMENTS

- the actuating device 14 includes a flat-shaped visible side 17, the visible side 17 facing away from the at least one actuating arm 5*a* in a mounted condition of the actuating device 14, and/or
- the at least one recess 15, in the first relative position of the actuating arm assembly 5, extends inclinedly (cf. FIG. 3*c*) to a plane formed by the front-sided opening 17 (FIG. 2*a*-2*d*) of the housing 9, and/or
- the at least one recess 15 has an insertion opening 19 (FIG. 3*c*) and an abutment 20 for the tool 16, the insertion opening 19 and the abutment 20 being mutually spaced from one another, the at least one actuating arm 5*a* is pivotally supported about at least one hinge axis 25 (FIG. 4*a*), and the abutment 20, in the first relative position of the actuating arm assembly 5, is arranged closer to the at least one hinge axis 25 than the insertion opening 19, and/or
- the at least one recess 15 is configured substantially cylindrical and/or conical, and/or
- the actuating arm assembly 5 includes at least one actuating arm 5*a* configured to be connected to the movable furniture part 3, and a tool 16 configured to be received within the at least one recess 15 can be arranged in an extension of the actuating arm 5*a*.

By at least one latching device 21, the actuating device 14 can be releasably latched relative to the housing 9 of the furniture drive 4 in the first relative position of the actuating arm assembly 5, preferably wherein:

- the at least one latching device 21 includes at least one spring tongue 22, preferably at least two spring tongues 22 mutually spaced from one another, and/or
- the at least one latching device 21 includes at least one recess 29 (FIG. 5*a*, 5*b*) and at least one latching element 23 configured to be arranged within the at least one recess 29, the at least one latching element 23 being arranged on the at least one actuating device 14 and the at least one recess 29 being arranged on or within the housing 9 of the furniture drive 4, or vice versa.

Moreover, a locking device 24 is provided for connecting the at least one actuating device 14 or, alternatively, a fitting element configured to be releasably connected to the movable furniture part 3, to the at least one actuating arm 5*a*, preferably wherein the at least one locking device 24

- includes at least one resilient or a spring-loaded locking element 26 (FIG. 4*b*) and at least one recess 24*b* for receiving the locking element 26, the locking element 26 being arranged on the at least one actuating arm 5*a* and the recess 24*b* being arranged on the actuating device 14 or on the fitting element, or vice versa, and/or
- includes at least one holding pin 28 (FIG. 4*b*) and at least one notch 24*a* for receiving the holding pin 28, the holding pin 28 being arranged on the at least one actuating arm 5*a* and the notch 24*a* being arranged on the actuating device 14 or on the fitting element, or vice versa, and/or
- includes at least one resilient or a spring-loaded locking element 26 (FIG. 4*b*) and at least one holding pin 28 (FIG. 4*b*) spaced from the at least one locking element 26.

The fitting element is not explicitly shown in the figures. However, the fitting element, as commonly known, is configured for the releasable connection, in particular for the tool-free connection, to the at least one actuating arm 5*a* of the actuating arm assembly 5.

Figure 4A:
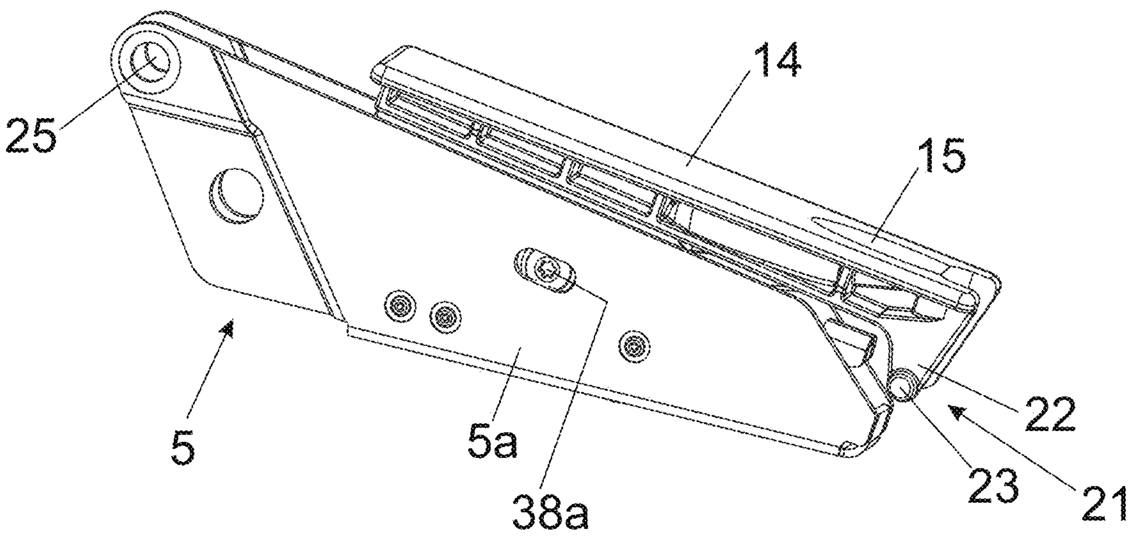
FIG. 4*a*, 4*b* show the actuating device connected to the actuating arm in a side view and in a cross-sectional view.

FIG. 4*a* shows the actuating arm 5*a* of the actuating arm assembly 5 in a connected condition with the actuating device 14, the actuating arm 5*a* being pivotable about the hinge axis 25. The actuating device 14 is configured to be releasably locked to the actuating arm 5*a* via the locking device 24.

Figure 4B:
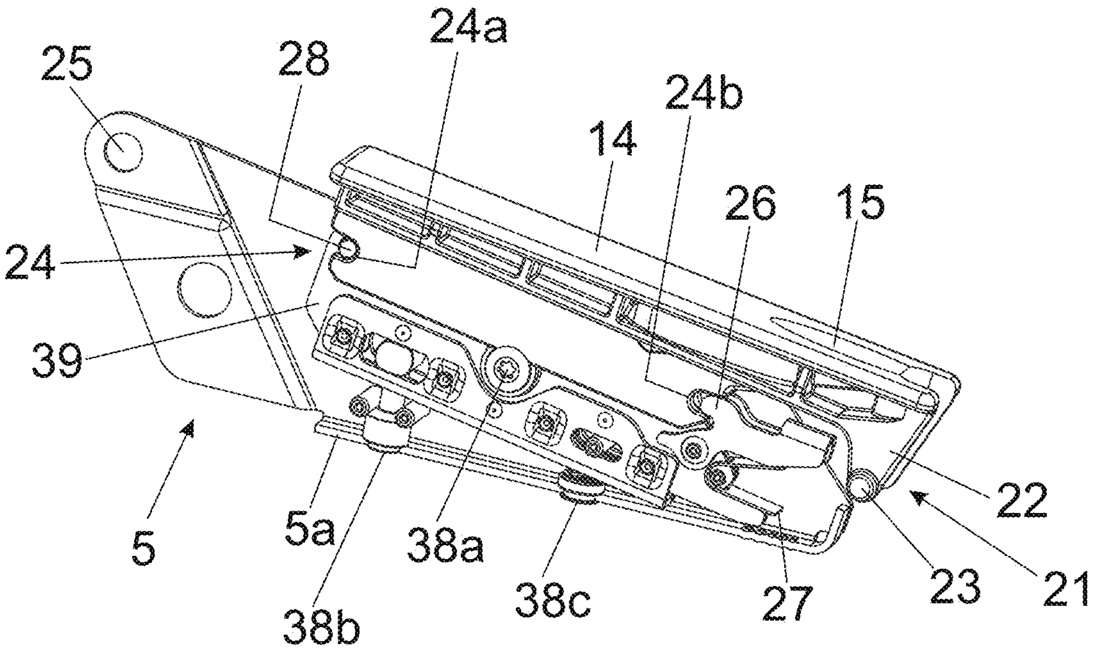

FIG. 4*b* shows a cross-sectional view of the arrangement according to FIG. 4*a*, in which the locking device 24 is shown in greater detail. For mounting the actuating device 14, the holding pin 28 of the actuating arm 5*a* is initially introduced into the notch 24*a* of the actuating device 14. In an engaged condition, the actuating device 14 is pivoted, and can be subsequently releasably locked by the movably-supported locking element 26. The locking element 26 arranged on the actuating arm 5*a* is pressurized by a force storage member 27, for example by a leaf spring, in a direction of a locked position. In a locked condition, the locking element 26 of the actuating arm 5*a* engages into the recess 24*b* of the actuating device 14.

The at least one actuating arm 5*a* includes at least one mounting member 39 configured to be fixed to the movable furniture part 3, and at least one adjustment device 38*a*, 38*b*, 38*c* for adjusting a position of the at least one mounting member 39 relative to the at least one actuating arm 5*a*. In the shown embodiment, the at least one actuating arm 5*a* includes three adjustment devices 38*a*, 38*b*, 38*c* with three rotatably-supported operating elements. By the adjustment devices 38*a*, 38*b*, 38*c*, a position of the furniture part 3 relative to the actuating arm 5*a* can be adjusted in a three-dimensional manner in a connected condition of the movable furniture part 3.

By the first adjustment device 38*a*, a position of the actuating device 14 (or, alternatively, a position of the fitting element configured to be fixed to the movable furniture part 3) can be adjusted in a lateral direction relative to the actuating arm 5*a*. By the second adjustment device 38*b*, an inclination of the mounting member 39 relative to the actuating arm 5*a* can be adjusted. By the third adjustment device 38*c*, a height of the mounting member 39 relative to the actuating arm 5*a* can be adjusted.

Figure 5A:
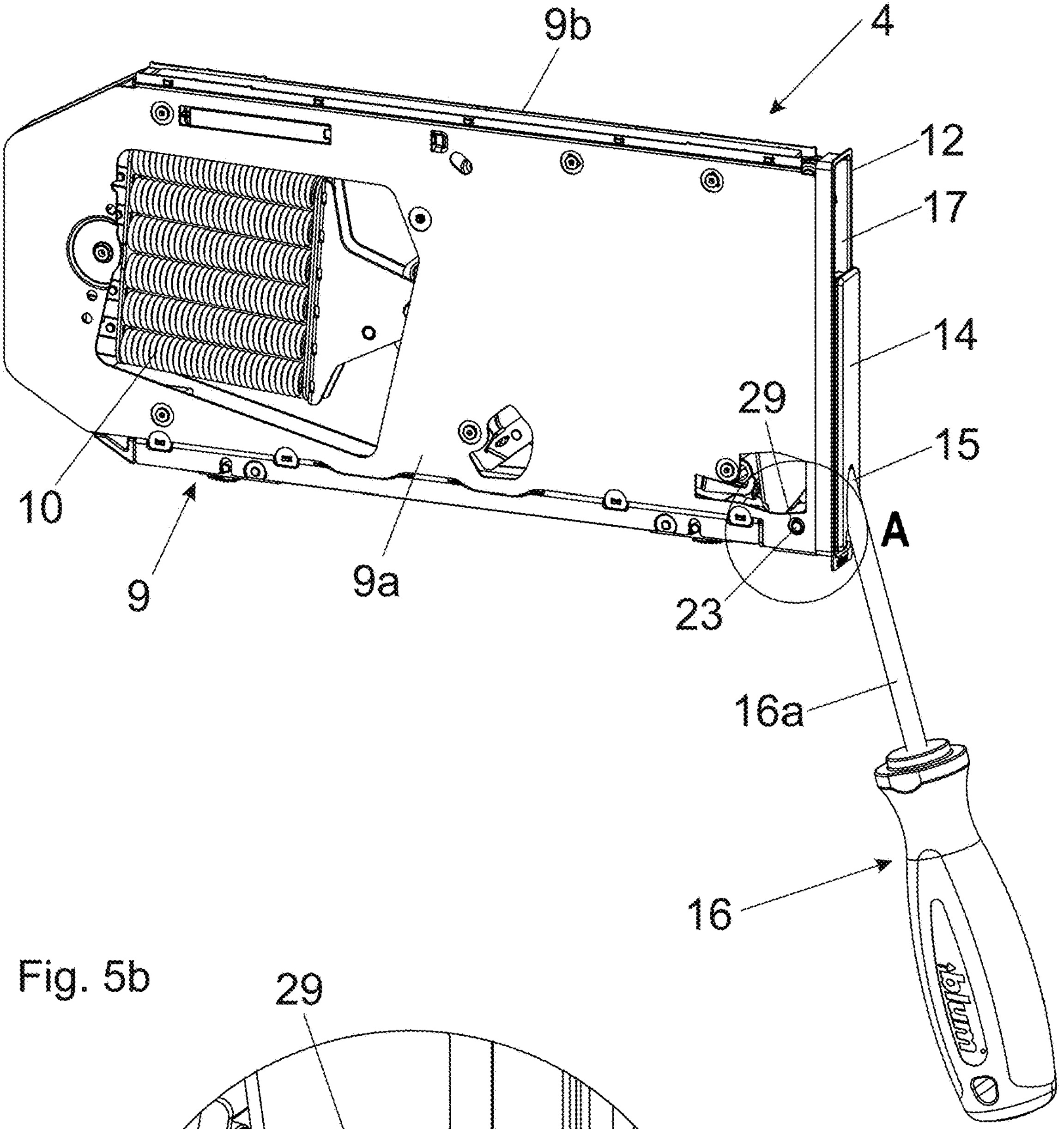
FIG. 5*a*, 5*b* show a perspective view of the furniture drive and an enlarged detail view thereof.

FIG. 5*a* shows the furniture drive 4 in a perspective view. The housing 9 of the furniture drive 4 includes two substantially flat-shaped housing walls 9*a*, 9*b* mutually spaced from one another in a parallel relationship. The actuating arm assembly 5, in its first relative position, is entirely received between the two housing walls 9*a*, 9*b*. The spring device 10 for applying a force to the actuating arm assembly 5 can also be seen. The spring device 10 can include a spring assembly having a plurality of helical springs, preferably compression springs, switched in a parallel relationship to one another.

At least one recess 29 is provided on the housing 9, the recess 29 being configured to receive the latching element 23 (FIG. 3*a*) of the actuating device 14. In this way, an undesired opening movement of the actuating arm assembly 5 can be prevented. This is, in particular, advantageous when the spring device 10, in the closing region of the at least one actuating arm 5*a*, does not apply a closing force to the at least one actuating arm 5*a*, but does rather apply a torque acting in opening direction to the at least one actuating arm 5*a* in the closing region.

According to an embodiment, the actuating device 14 includes at least two latching elements 23 separate from one another. A first latching element 23 of the actuating device 14 is configured to be received in a first recess 29 of the first housing wall 9*a*. The second latching element 23 of the actuating device 14 is configured to be received in a second recess 29 of the second housing wall 9*b*. In this way, the actuating device 14 can be locked in a tilt-proof manner in relation to the housing 9.

Figure 5B:
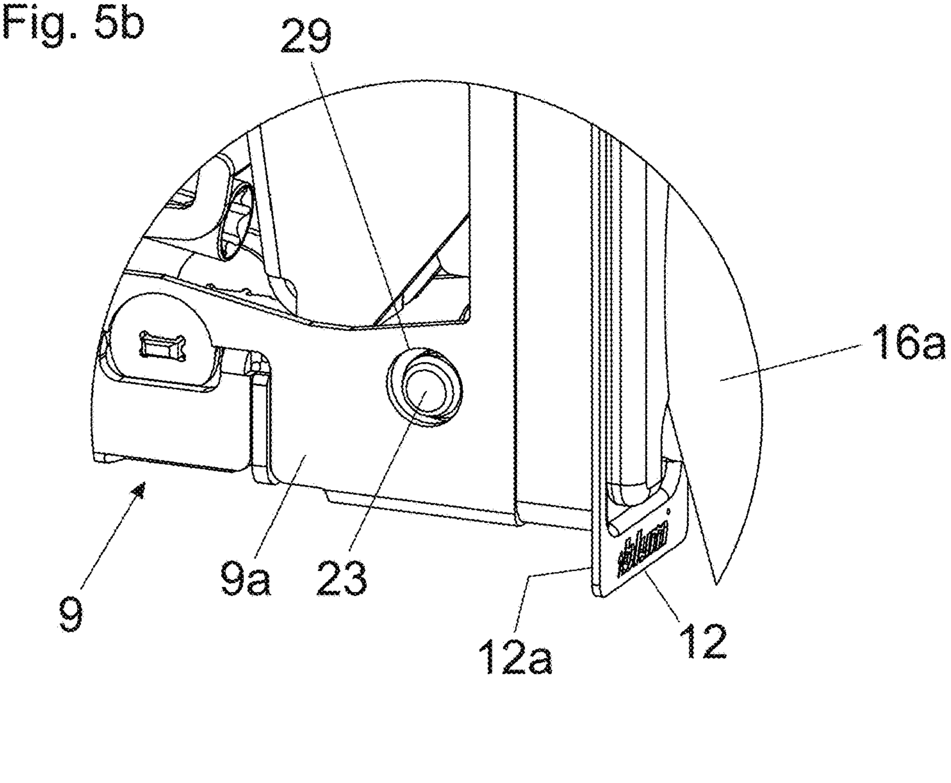

FIG. 5*b* shows the encircled region of FIG. 5*a* in an enlarged view. The latching element 23 can be configured so as to be cylindrical at least over a region, and can be received in a circular recess 29 of the housing 9. The locking between the latching element 23 and the recess 29 can be released by applying a manual pulling force to the actuating element 14, whereby the latching element 23 can be moved out from the recess 29 against a resilient action of the latching element 23. The at least one latching element 23 is movably supported in a direction extending substantially perpendicular to a plane formed by the housing walls 9*a*, 9*b*.

In FIG. 5*b*, it can further be seen that a cover 12 is provided on the housing 9 of the furniture drive 4. The cover 12 includes at least one laterally protruding and substantially annular-shaped flange 12*a*. This flange 12*a* forms a depth-abutment for the housing 9 of the furniture drive 4, the flange 12*a* being configured to bear against the front face 6*a* (FIG. 1*b*) of the furniture panel 6. As a result, the housing 9 adopts a defined depth position relative to the furniture panel 6 in a mounted condition. Moreover, the flange 12*a* is configured to cover a gap formed between the housing 9 and an inner wall of the recess 11 (FIG. 1*b*) in a mounted condition of the furniture drive 4.

Figure 6A:
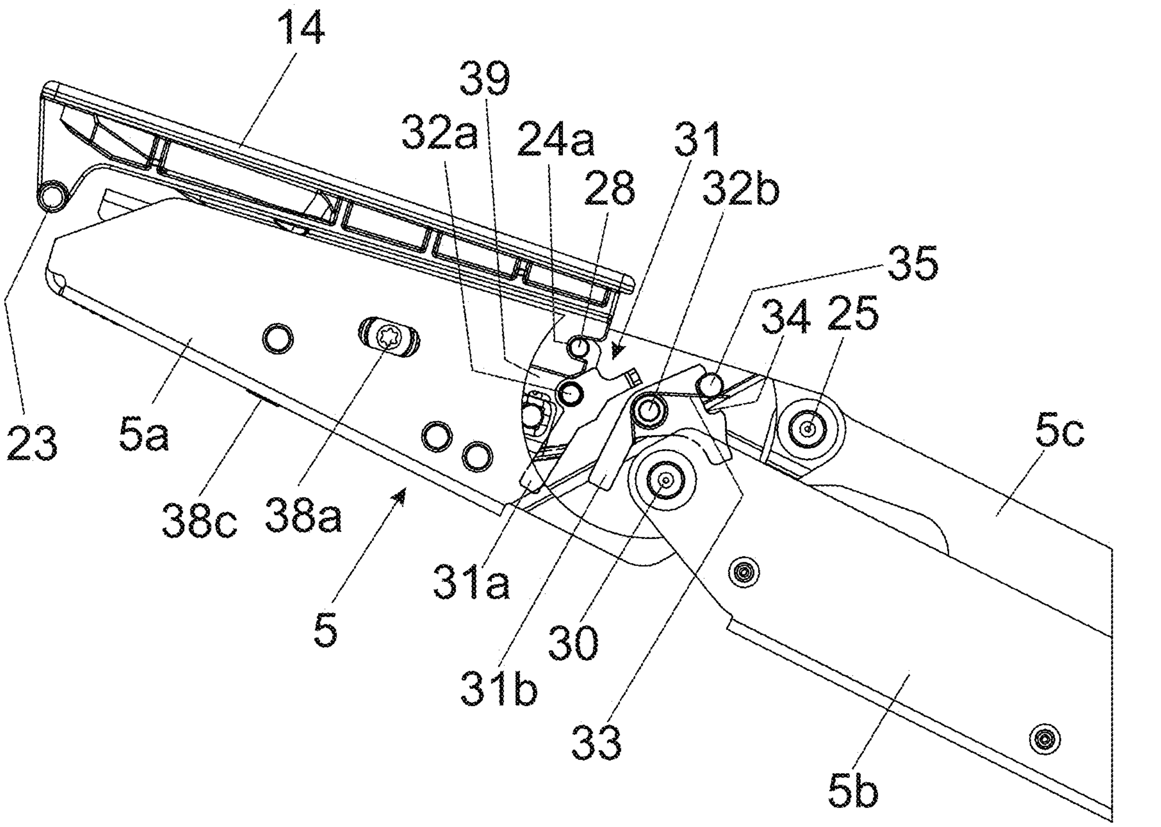
FIG. 6*a*, 6*b* show the actuating device connected to the actuating arm in a side view and in a cross-sectional view.

FIG. 6*a* shows a portion of the actuating arm assembly 5, in which the at least one actuating arm 5*a* is hingedly connected to the actuating arm 5*b* via a hinge axis 30, and is hingedly connected to the actuating arm 5*c* via a further hinge axis 25.

The furniture drive 4 includes a releasable blocking device 31, and a pivotal movement of the actuating arm assembly 5 from the second relative position in a direction of the first relative position can be blocked by the releasable blocking device 31.

The releasable blocking device 31 includes at least two movably-supported blocking elements 31*a*, 31*b*. Preferably, the blocking elements 31*a*, 31*b* are pivotable about pivoting axis 32*a*, 32*b*. The blocking elements 31*a*, 31*b* are movably-supported relative to one another between a blocking position and at least one release position. In the blocking position of the blocking elements 31*a*, 31*b*, a movement of the actuating arm assembly 5 between the first relative position and the second relative position can be blocked. In the release position of the blocking elements 31*a*, 31*b*, a movement of the actuating arm assembly 5 between the first relative position and the second relative position can be unblocked. The at least two blocking elements 31*a*, 31*b* of the blocking device 31 bear against one another in the blocking position and/or are mutually spaced from one another in the release position. At least one blocking element 31*a*, 31*b*, preferably both blocking elements 31*a*, 31*b*, can be configured as a double-armed lever having two lever ends.

The at least one actuating arm 5*a* includes at least one mounting member 39 configured to be fixed to the movable furniture part 3, and at least one adjustment device 38*a*, 38*b*, 38*c* for adjusting a position of the at least one mounting member 39 relative to the at least one actuating arm 5*a*. At least one blocking element 31*a* of the blocking device 31 is movably supported, preferably pivotally supported, on the at least one mounting member 39.

Figure 6B:
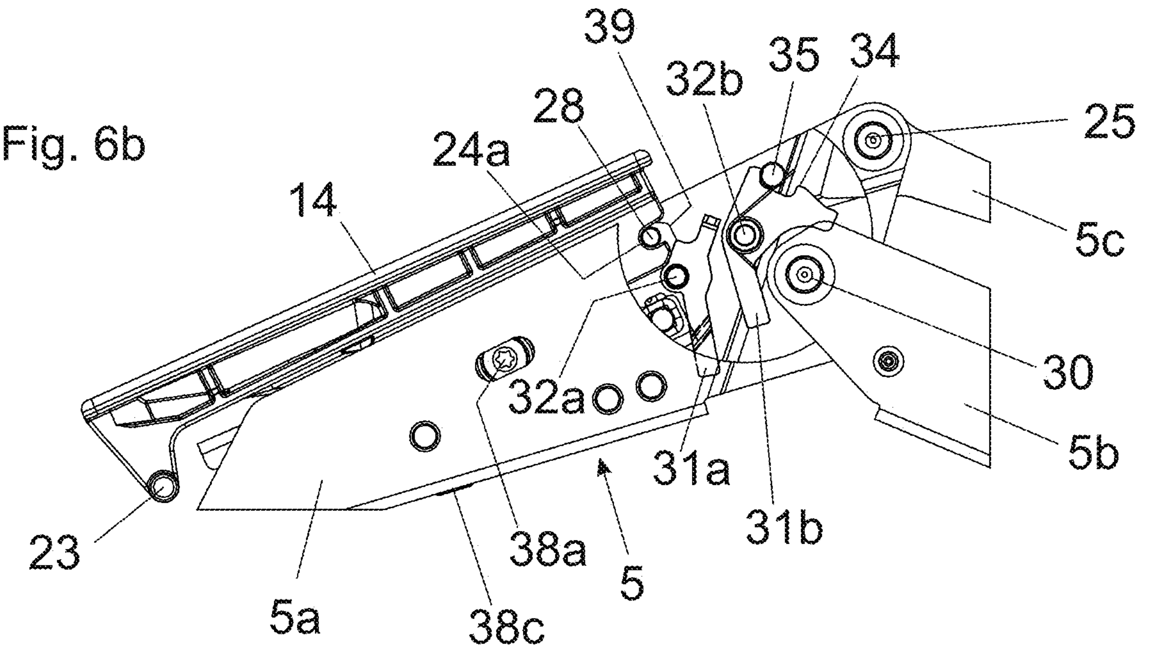

In the shown FIGS. 6*a*, 6*b*, the blocking elements 31*a*, 31*b* are located the release position, so that a movement of the actuating arm assembly 5 between the first relative position and second relative position can be made possible. The release position is present, because the actuating device 14 is duly connected to the at least one actuating arm 5*a*. This is can be seen because the holding pin 28 of the actuating arm 5*a* engages into the notch 24*a* of the actuating device 14.

The first blocking element 31*a* is pivotally supported about a first pivoting axis 32*a*. The first blocking element 31*a* is pre-stressed by a force storage member 33 (not shown here) about the first pivoting axis 32*a* in a counter-clockwise direction and thus bears against the actuating device 14 by a force of the force storage member 33.

The second blocking element 31*b* is pivotally supported about a second pivoting axis 32*b*. The second blocking element 31*b* is pre-stressed by the shown force storage member 33 about the second pivoting axis 32*b* in a clockwise direction and thus bears against a support element 35 of the actuating arm 5*a* by a force of the force storage member 33.

In a duly connected condition between the actuating device 14 and the at least one actuating arm 5*a*, the two blocking elements 31*a*, 31*b* are mutually spaced from one another, so that a movement of the actuating arm assembly 5 between the first relative position and the second relative position is unblocked. In the release position, the blocking elements 31*a*, 31*b* are mutually spaced from one another in all relative positions of the actuating arm assembly 5. This can be seen in FIGS. 6*a*, 6*b*.

Figure 7A:
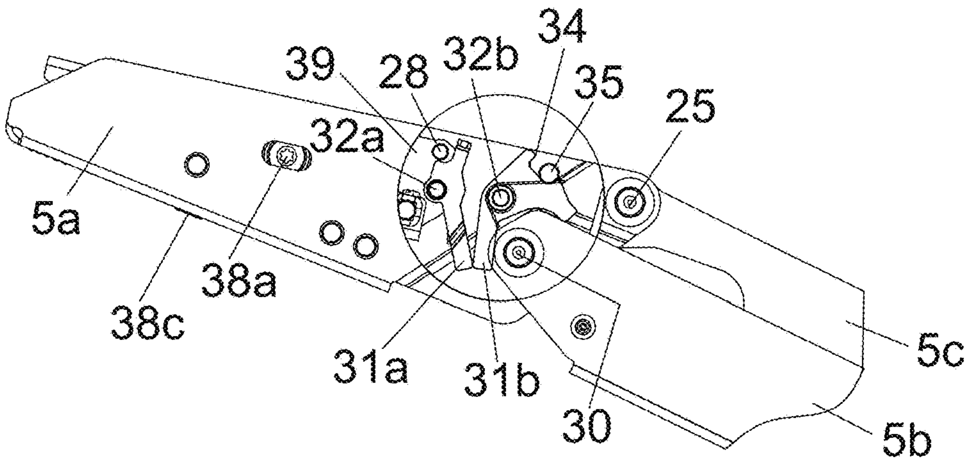
FIG. 7*a*-7*d* show the actuating arm assembly in two different relative positions and enlarged detail views thereof.

FIG. 7*a*, on the contrary, shows the separated condition between the actuating device 14 and the at least one actuating arm 5*a*. Therefore, the releasable blocking device 31 is located in a blocking position. In the blocking position, a movement of the actuating arm assembly 5 between the first relative position and the second relative position can be blocked or can be at least limited. The separated condition between the actuating device 14 and the actuating arm 5*a* can be seen, because the holding pin 28 of the actuating arm 5*a* does no longer engage into the notch 24*a* of the actuating device 14.

In FIG. 7*a*, the actuating arm assembly 5 is located in a fully-open condition relative to the housing 9 of the furniture drive 4. By an adjustment device known according to the prior art, the position of the maximum open position of the actuating arm assembly 5 relative to the housing 9 can be adjusted. In this way, the flexibility can be improved when the movable furniture part 3 is to be mounted to the at least one actuating arm 5*a*, because the actuating arm assembly 5 can be moved into a comfortable position for the operator due to a variable adjustment of the maximum open position.

The releasable blocking device 31 is provided to prevent a tensioning of the spring device 10 by a movement of the actuating arm assembly 5, starting from the second relative position (open position) into the first relative position (closed position), as long as a movable furniture part 3 is not connected to the actuating arm 5*a*. As long as the movable furniture part 3 is not connected to the actuating arm 5*a*, there is no counterweight acting against the spring device 10. Therefore, it would be possible that the actuating arm 5*a*, when not connected to the furniture part 3, could kick out in a direction of the open position in an uncontrolled manner. By the releasable blocking device 31, a movement of the actuating arm assembly 5 from the open position in a direction of the closed position can be thus blocked, thereby preventing a tensioning of the spring device 10.

As shown in FIG. 7*a*, the first blocking element 31*a*, due to the absence of the actuating device 14, can be pivoted in a clockwise direction about the first pivoting axis 32*a* by a force of the force storage member 33 (not shown here). Thereby, the longer lever arm of the first blocking element 31*b* abuts against the second blocking element 31*b*. As a result, the second blocking element 31*b* is pivoted about the second pivoting axis 32*b* in a counter-clockwise direction.

The force storage member 33 for pressurizing the first blocking element 31*a* is configured to be stronger than the force storage member 33 for pressurizing the second blocking element 31*b*. Therefore, the first blocking element 31*a* can reliably move the second blocking element 31*b* about the second pivoting axis 32*b*.

Figure 7B:
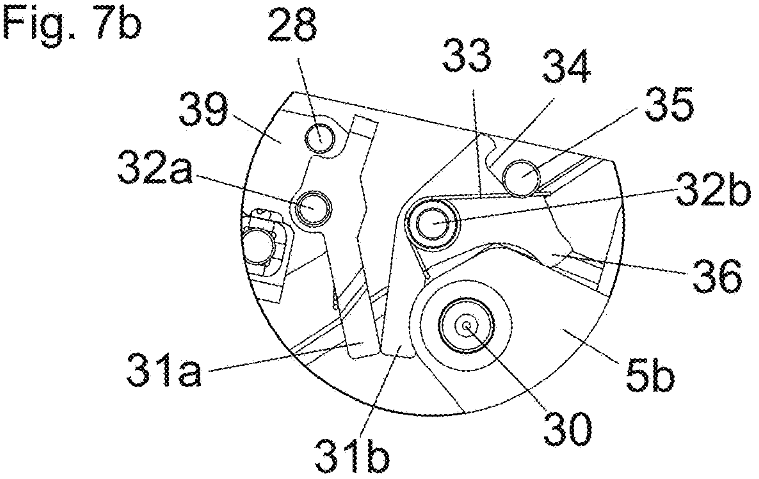

FIG. 7*b* shows the encircled region of FIG. 7*a* in an enlarged view. It can be seen that the second blocking element 31*b* includes an abutment 36 configured to abut against a counter-abutment 37 of the actuating arm 5*c*.

Figure 7C:
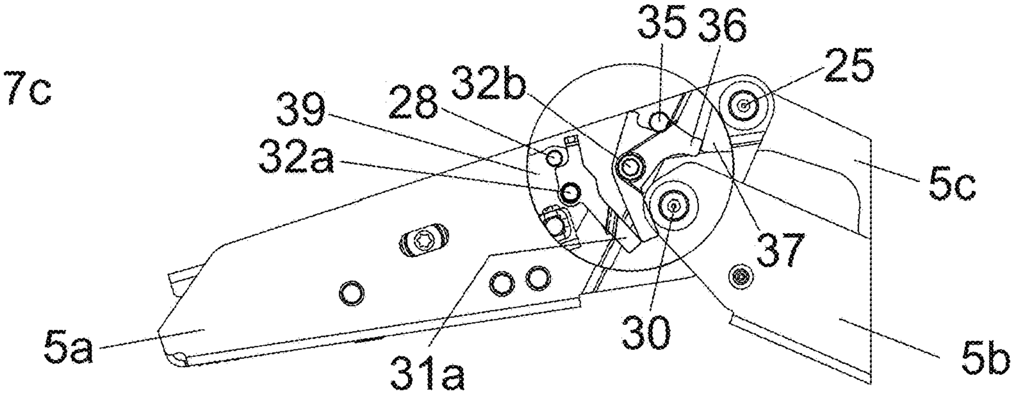

FIG. 7*c* shows a continued pivoting movement of the actuating arm assembly 5. Now, the abutment 36 of the second blocking element 31*b* abuts against the counter-abutment 37 of the actuating arm 5*c* so as to prevent a further pivoting movement of the actuating arm assembly 5 in a direction of the first relative position (closed position). In the blocking position of the blocking device 31, the actuating arm assembly 5 can thus only be moved from the position shown in FIG. 7*a* into the position shown in FIG. 7*c*, so that the spring device 10 cannot further be tensioned for safety reasons.

For the case that the actuating device 14 or the movable furniture part 3 is to be mounted to the actuating arm 5*a*, the releasable blocking device 31 is again automatically switched into the release position. By mounting the actuating device 14 or by mounting the movable furniture 3 to the actuating arm 5*a*, the first blocking element 31*a* is moved, from the position shown in FIG. 7*a*, again about the first pivoting axis 32*a* in a clockwise direction. The longer lever arm of the first blocking element 31*a* is thereby again spaced from the second blocking element 31*b*. Therefore, the second blocking element 31*b* is tilted in a counter-clockwise direction by a force of the force storage member 33, thereby spacing the abutment 36 and the counter-abutment 37 apart from one another. In this way, the blocking position can be again released.

Figure 7D:
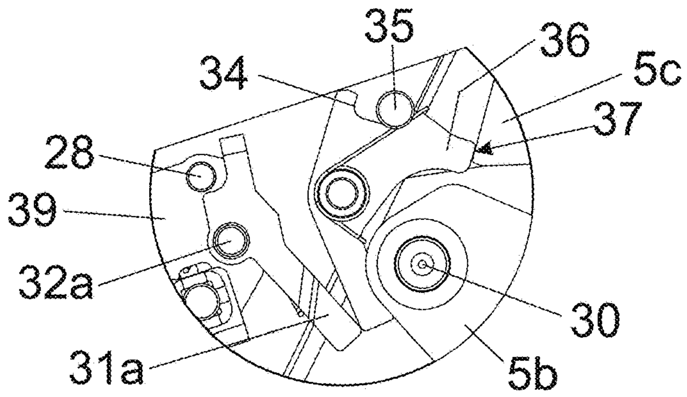

FIG. 7*d* shows the encircled region of FIG. 7*c* in an enlarged view.

Preferred embodiments:

at least one of the two blocking elements 31*a*, 31*b* of the blocking device 31 is pre-stressed by a force storage member 33, preferably both of the at least two blocking elements 31*a*, 31*b* are pre-stressed by a force storage member 33, particularly preferred that the two blocking elements 31*a*, 31*b* of the blocking device 31 are pre-stressed by the force storage members 33 in different movement directions and/or the force storage members 33 have a different spring force, preferably at least one force storage member 33, preferably both force storage members 33, includes or include a torsion spring, and/or the at least two blocking elements 31*a*, 31*b* of the blocking device 31 are arranged on a same actuating arm 5*a* of the at least two actuating arms 5*a*, 5*b*, 5*c* of the actuating arm assembly 5, and/or one of the at least two blocking elements 31*a*, 31*b* of the blocking device 31 includes a bearing contour 34 for supporting a support element 35 of an actuating arm 5*a*, and/or one of the at least two blocking elements 31*a*, 31*b* of the blocking device 31 is supported on one of the at least two actuating arms 5*a*, 5*b*, 5*c*, and includes an abutment 36 configured to bear against a counter-abutment 37 of the other of the at least two actuating arms 5*a*, 5*b*, 5*c* in the blocking position, and/or at least one of the at least two blocking elements 31*a*, 31*b* of the blocking device 31 can be moved from the blocking position into the release position by mounting the actuating device 14 or by mounting a fitting element configured to be connected to the movable furniture part 3.

The invention claimed is:

1. A furniture drive for moving a furniture part movably supported relative to a furniture carcass, the furniture drive comprising: a housing to be arranged on or within a furniture panel of the furniture carcass;

an actuating arm assembly for moving the movable furniture part, the actuating arm assembly including a first actuating arm movably-supported relative to the housing, the first actuating arm being configured to be fixed to the movable furniture part, wherein the actuating arm assembly is movable at least between a first relative position, in which the first actuating arm is arranged within the housing, and a second relative position, in which the first actuating arm is arranged outside the housing;

an actuating device, the actuating device being configured to be releasably connected to the actuating arm and being configured to move the actuating arm assembly from the first relative position into the second relative position; and wherein the actuating device includes at least one recess to receive a tool.

2. The furniture drive according to claim 1, wherein at least one latching device is provided for releasably latching the actuating device relative to the housing in the first relative position of the actuating arm assembly.

3. The furniture drive according to claim 1, wherein the housing includes a front-sided opening, and the actuating device, in the first relative position of the actuating arm assembly, protrudes through the front-sided opening of the housing.

4. The furniture drive according to claim 1, wherein at least one locking device is provided for releasably connecting the actuating device or, alternatively, for releasably connecting a fitting element configured to be connected to the movable furniture part to the first actuating arm.

5. The furniture drive according to claim 1, further comprising a releasable blocking device, wherein the actuating arm assembly of the furniture drive includes a second actuating arm, the first and second actuating arms being pivotable relative to one another, wherein a pivoting movement of the actuating arm assembly from the second relative position in a direction of the first relative position can be blocked by the blocking device.

6. The furniture drive according to claim 5, wherein the releasable blocking device includes two movably supported blocking elements, the blocking elements being movably supported relative to one another between a blocking position and a release position, wherein in the blocking position of the blocking elements, a movement of the actuating arm assembly between the first relative position and the second relative position is blocked, and wherein in the release position of the blocking elements, a movement of the actuating arm assembly between the first relative position and the second relative position is unblocked.

7. The furniture drive according to claim 6, wherein:

a first blocking element of the two blocking elements of the blocking device is pre-stressed by a first force storage member; or the two blocking elements of the blocking device are arranged on a same actuating arm of the first and second actuating arms of the actuating arm assembly; or one of the two blocking elements of the blocking device includes a supporting contour for supporting a support element of one of the first and second actuating arms; or one of the two blocking elements of the blocking device is supported on one of the first and second actuating arms and includes and abutment configured to be supported on a counter-abutment of the other of the first and second actuating arms in the blocking position; or one of the two blocking elements of the blocking device can be moved from the blocking position into the release position by mounting the actuating device or by mounting a fitting element configured to be connected to the movable furniture part.

8. The furniture drive according to claim 1, further comprising a spring device for applying a force to the actuating arm assembly.

9. The furniture drive according to claim 1, wherein the actuating device, at least in the first relative position in which the first actuating arm is arranged within the housing, is non-pivotally connected to the first actuating arm.

10. An item of furniture comprising:

a furniture carcass;

at least one furniture part movably-supported relative to the furniture carcass; and the furniture drive according to claim 1.

11. A method for mounting a furniture part to the furniture drive according to claim 1, comprising:

arranging the housing of the furniture drive on or within a furniture panel of the furniture carcass;

moving the actuating arm assembly from the first relative position into the second relative position with the aid of the actuating device;

releasing the actuating device from the first actuating arm; and mounting the furniture part to the first actuating arm.

12. The furniture drive according to claim 1, wherein the furniture drive is configured to move a furniture flap which pivots relative to the furniture carcass about a horizontally extending axis.

13. The furniture drive according to claim 1, wherein: the housing has a front-sided opening and the at least one recess, in the first relative position of the actuating arm assembly, extends inclinedly to a plane formed by the front-sided opening; or the at least one recess has an insertion opening and an abutment for the tool, the insertion opening and the abutment being mutually spaced from one another, the first actuating arm being pivotally supported about at least one hinge axis, and wherein the abutment, in the first relative position of the actuating arm assembly, is arranged closer to the at least one hinge axis than the insertion opening; or the at least one recess is configured substantially cylindrical or conical; or a tool configured to be received within the at least one recess can be arranged in an extension of the first actuating arm.

14. The furniture drive according to claim 13, wherein the at least one recess is configured to receive a screwdriver.

15. The furniture drive according to claim 2, wherein:

the at least one latching device includes at least one spring tongue; or the at least one latching device includes at least one recess and at least one latching element configured to be arranged in the at least one recess, wherein the at least one latching element is arranged on the actuating device and the at least one recess is arranged within or on the housing, or the at least one latching element is arranged on the housing and the at least one recess is arranged within or on the actuating device.

16. The furniture drive according to claim 15, wherein the at least one latching device includes the at least one spring tongue, and the at least one spring tongue comprises at least two mutually spaced spring tongues.

17. The furniture drive according to claim 4, wherein the at least one locking device:

includes a resilient or a spring-loaded locking element and a recess for receiving the locking element, wherein the locking element is arranged on the first actuating arm and the recess for receiving the locking element is arranged on the actuating device or on the fitting element, or the locking element is arranged on the actuating device or on the fitting element and the recess for receiving the locking element is arranged on the first actuating arm; or includes a holding pin and a notch for receiving the holding pin, the holding pin being arranged on the first actuating arm and the notch being arranged on the actuating device or on the fitting element, or the holding pin being arranged on the actuating device or on the fitting element and the notch being arranged on the first actuating arm; or includes a resilient or a spring-loaded locking element and at least one holding pin spaced from the locking element.

18. The furniture drive according to claim 6, wherein the blocking elements are pivotally supported, and wherein the blocking elements of the blocking device bear against one another in the blocking position or are mutually spaced from one another in the release position.

19. The furniture drive according to claim 7, wherein:

the first blocking element is pre-stressed by the force storage member, and a second blocking element of the two blocking elements of the blocking device is pre-stressed by a second force storage member, and wherein at least one of the first and second force storage members includes a torsion spring.

20. The furniture drive according to claim 19, wherein the first and second blocking elements are pre-stressed by the first and second force storage members in different movement directions, or the first and second force storage members have different respective spring forces, and wherein each of the first and second first and force storage members includes a torsion spring.

21. The furniture drive according to claim 8, wherein:

the actuating arm assembly is pressurized by the spring device within a first pivotal angle range in a direction of the first relative position, and is pressurized by the spring device within a second pivotal angle range in a direction of the second relative position; or the spring device includes at least one helical spring.

22. The furniture drive according to claim 21, wherein the at least one helical spring is at least one compression spring.

23. The item of furniture according to claim 10, wherein the at least one furniture part includes a furniture flap configured to pivot relative to the furniture carcass about a horizontally extending axis, and wherein the furniture carcass includes at least one furniture panel, and the housing of the furniture drive is substantially entirely received within the furniture panel of the furniture carcass.

24. The furniture drive according to claim 1, wherein in the first relative position, the actuating arm assembly is entirely received within the housing.

* * * * *